(12) United States Patent
Tajan et al.

(10) Patent No.: US 9,765,624 B2
(45) Date of Patent: Sep. 19, 2017

(54) PROPELLER COMPRISING A COUNTERWEIGHT SYSTEM PROVIDED WITH AN AIR DISCHARGE CHANNEL

(71) Applicant: SNECMA, Paris (FR)

(72) Inventors: Sebastien Tajan, Sucy en Brie (FR); Christophe Jacquemard, Hericy (FR)

(73) Assignee: SNECMA, Paris (FR)

( * ) Notice: Subject to any disclaimer, the term of this patent is extended or adjusted under 35 U.S.C. 154(b) by 823 days.

(21) Appl. No.: 14/048,357

(22) Filed: Oct. 8, 2013

(65) Prior Publication Data
US 2014/0099206 A1    Apr. 10, 2014

(30) Foreign Application Priority Data

Oct. 10, 2012 (FR) ..................... 12 59648
Oct. 10, 2012 (FR) ..................... 12 59649
Oct. 10, 2012 (FR) ..................... 12 59652
Oct. 10, 2012 (FR) ..................... 12 59653
Oct. 10, 2012 (FR) ..................... 12 59654

(51) Int. Cl.
*F01D 5/08* (2006.01)
*F01D 1/26* (2006.01)
*F01D 7/00* (2006.01)

(52) U.S. Cl.
CPC ............... *F01D 5/081* (2013.01); *F01D 1/26* (2013.01); *F01D 7/00* (2013.01); *Y02T 50/672* (2013.01); *Y02T 50/676* (2013.01)

(58) Field of Classification Search
CPC ........... F01D 5/081; F01D 5/082; F01D 5/084
USPC ........................................................ 416/153
See application file for complete search history.

(56) References Cited

U.S. PATENT DOCUMENTS

| 2,554,611 | A | * | 5/1951 | Biermann | ............... B64C 11/42 |
| | | | | | 416/154 |
| 4,459,949 | A | | 7/1984 | Weintz | |
| 4,732,538 | A | * | 3/1988 | Wollenweber | .......... F01D 5/084 |
| | | | | | 416/129 |

(Continued)

FOREIGN PATENT DOCUMENTS

| BE | 438 569 | 5/1940 |
| DE | 87 13 745 U1 | 3/1988 |

(Continued)

OTHER PUBLICATIONS

NOAA—Air Resources Labratory, Sep. 23, 2008.*

(Continued)

*Primary Examiner* — Nathaniel Wiehe
*Assistant Examiner* — Brian O Peters
(74) *Attorney, Agent, or Firm* — Oblon, McClelland, Maier & Neustadt, L.L.P.

(57) ABSTRACT

The main aim of the invention is a propeller (32) for a turboengine (1) comprising a plurality of blades (48) and a blade support ring (47) provided with housings (50), each receiving a pivot (52) bearing the foot (58) of one of said blades (48), characterized in that at least one of the pivots (52) is equipped with at least one counterweight system (90, 91) provided with at least one inner channel (93, 96) for airflow ventilation discharge ($F_1$, $F_3$) for capturing and guiding said airflow directly in contact with the blade foot (58) borne by said at least one of the pivots (52).

32 Claims, 8 Drawing Sheets

(56) References Cited

U.S. PATENT DOCUMENTS

| | | | |
|---|---|---|---|
| 5,039,278 A * | 8/1991 | Wakeman | F01D 7/00 416/239 |
| 5,112,191 A * | 5/1992 | Strock | B64C 11/06 416/129 |
| 6,672,075 B1 | 1/2004 | Sandu et al. | |
| 6,994,071 B2 * | 2/2006 | Schwam | B64D 27/02 123/242 |
| 2011/0083417 A1 | 4/2011 | Keating | |
| 2011/0167835 A1 | 7/2011 | Beutin et al. | |
| 2012/0020796 A1 | 1/2012 | Carre et al. | |

FOREIGN PATENT DOCUMENTS

| | | |
|---|---|---|
| DE | 10 2006 012 977 A1 | 10/2007 |
| FR | 2 586 754 A1 | 3/1987 |
| FR | 2 645 590 A1 | 10/1990 |
| FR | 2 941 494 A1 | 7/2010 |
| FR | 2 957 329 A1 | 9/2011 |
| FR | 2 963 054 A1 | 1/2012 |
| FR | 2 967 397 A1 | 5/2012 |
| GB | 2 254 379 | 10/1992 |
| JP | 2007-120460 | 5/2007 |
| WO | WO 2010/128241 A2 | 11/2010 |

OTHER PUBLICATIONS

U.S. Appl. No. 14/044,208, filed Oct. 2, 2013, Tajan et al.

French Preliminary Search Report issued Jul. 11, 2013 in French 12 59654, filed on Oct. 10, 2012 (with English Translation of category of Cited Documents).

French Preliminary Search Report issued May 31, 2013 in French 12 59653, filed on Oct. 10, 2012 (with English Translation of category of Cited Documents).

French Preliminary Search Report issued Jul. 17, 2013 in French 12 59652, filed on Oct. 10, 2012 (with English Translation of category of Cited Documents).

French Preliminary Search Report issued Jul. 17, 2013 in French 12 59649, filed on Oct. 10, 2012 (with English Translation of category of Cited Documents).

French Preliminary Search Report issued Jul. 16, 2013 in French 12 59648, filed on Oct. 10, 2012 (with English Translation of category of Cited Documents).

* cited by examiner

PROPELLER COMPRISING A COUNTERWEIGHT SYSTEM PROVIDED WITH AN AIR DISCHARGE CHANNEL

TECHNICAL FIELD

The present invention relates to the field of turboengines, especially to that of open propellers for turboengine, and more specifically to cooling of the elements of these propellers, in particular the blade feet. It relates to a propeller for a turboengine, and also the turboengine comprising such a propeller.

The invention applies to any type of terrestrial or aeronautical turboengines, and especially to aircraft turboengines such as turbojets and turboprops. More particularly, the invention applies preferably in the field of turboengines for aircraft whereof the receiver comprises a pair of open contrarotating propellers, this type of turboengine also being called <<open fan>>, or bearing the English terms <<open rotor>> or <<propfan>>. Such a turboengine can for example comprise a fan fixed directly to the power turbine and outside the nacelle, or driven by means of a reducer power turbine.

PRIOR ART

FIG. 1 schematically illustrates a turboengine 1 with a pair of open contrarotating propellers, so-called <<open rotor>>, according to a classic realisation of the prior art, such as is known from patent application FR 2 941 494.

In this FIG. 1, the direction A corresponds to the longitudinal direction or axial direction, parallel to the longitudinal axis 2 of the turboengine 1. The direction B corresponds as such to the radial direction of the turboengine 1. In addition, arrow 4 shows the main gas discharge direction through the turboengine 1. The terms <<upstream>> and <<downstream>> used throughout the description are to be considered relative to this gas discharge direction 4.

In its front part, the turboengine 1 has an air intake 6 continuing to the rear via a nacelle 8, the latter overall comprising an outer skin 10 and an inner skin 12, both centred on the axis 2 and offset radially to each other.

The inner skin 12 forms an external radial housing for a gas generator 14, comprising conventionally, from the front to the rear, a low-pressure compressor 16, a high-pressure compressor 18, a combustion chamber 20, a high-pressure turbine 22, and an intermediate-pressure turbine 24. The compressor 16 and the turbine 24 are connected mechanically by a shaft 26, forming a low-pressure body, whereas the compressor 18 and the turbine 22 are connected mechanically by a shaft 28, forming a higher-pressure body. Consequently, the gas generator 14 preferably has a classic design, called double body design.

Downstream of the intermediate-pressure turbine 24 is a receiver 30 with a pair of open contrarotating propellers, driven in this example by free power turbines. As a variant, a reducer power turbine can be used. More precisely, this receiver 30 is arranged downstream of a fixed housing 42, in turn arranged in the rear extension of the external radial housing 12 of the gas generator 14. Also, the housings 12 and 42 can be made in a single piece. The fixed housing 42 then extends to the rear as it narrows according to the radial direction to form a fixed shaft 57 centred on the axis 2, forming the fixed housing of the receiver 30.

The receiver 30 first comprises a first rotating assembly 32a fitted with a first propeller 32, a first free power turbine 34 driving this propeller, and a first rotating structural device 33 located in the axial extension of the free turbine 34 to the front, by being interposed between the first stage of this turbine and the fixed housing 42. The rotating structural device 33 generally takes the form of a plurality of arms spaced circumferentially to each other, and which extend radially. These arms are connected to the first propeller 32 by bearing the external turbine housing 49, itself connected to the propeller 32 in particular by way a flange or a plurality of clips 44 to radially deflect this propeller 32 to the outside. The clips 44 have a radial internal end connected to the external housing 49, and a external radial end connected to a polygonal ring (not shown in FIG. 1) for support of blades 48. These blades 48 project radially to the outside from a housing or external propeller cowling 46, one of the particular features of which is being in the rear aerodynamic continuity of the outer skin 10 of the nacelle.

Similarly, the receiver 30 comprises a second rotating assembly 36a fitted with a second propeller 36, a second free power turbine 38 driving this propeller, and a second rotating structural device 37 located in the axial extension of the free turbine 38 to the rear, by being located behind the last stage of this turbine 38. The rotating structural device 37, which extends essentially radially, supports the second propeller 36 by being connected in particular by way of a flange or a plurality of clips 51 for radially deflecting the propeller 36 to the outside. Here also, the clips 51 have an internal radial end connected to the turning structural 37, housing and an external radial end connected to a polygonal ring (not shown in FIG. 1) for support of blades 55. These blades 55 project radially to the outside from an external housing or cowling 54, which is in the rear aerodynamic continuity of the external cowling 46 of the first propeller 32.

Also, the first and second free turbines 34, 38 are nested in each other to form a pair of contrarotating turbines. The stages of the first turbine 34 are arranged to alternate with the stages of the second turbine 38, in direction A. This pair is therefore can also be assimilated into a turbine having two contrarotating rotors. By way of indication, the free turbines 34, 38 have no direct mechanical link with the rotating components of the gas generator 14, specifically they do not drive nor are driven by the elements 16, 18, 22, 24. Only the gases from the primary vein escaping from the intermediate-pressure turbine 24 therefore ensure rotation of these free turbines 34, 38 forming the pair of contrarotating turbines.

In reference now more specifically to FIGS. 2 to 4, these show in more detail the design of the first propeller 32, given that the second propeller 36 has an identical or similar design, and that it will not be described further.

As mentioned previously, the propeller 32 comprises a polygonal ring 47 serving as support for blades 48, this ring 47 forming a hub of the propeller. It comprises a plurality of housings 50 spaced circumferentially from each other, these housings 50 being called radial housings. Each of them receives a pivot 52, a roller 80 being interposed between this pivot 52 and associated housing 50 forming a bore, as has been illustrated in FIG. 3.

Each pivot 52 has a lower part 52a placed inside its associated housing, this lower part 52a being substantially cylindrical and hollow so as to exhibit a general U-shaped cross-section radially open towards the interior. In addition, the pivot 52 extends radially to the outside via an upper part 52b located above the ring 47, this upper part 52b having a groove 56 shown in FIG. 4, and whereof the function is to hold the foot 58 of the associated blade 48. Therefore, the pivot 52 bears the blade 48 and enables it to be adjusted by controlling the rotation of this same pivot 52 within its housing 50 of the polygonal ring 47.

The propeller 32 also includes the external cowling 46 illustrated in FIGS. 1 and 3 only. The external surface of this cowling is contacted by external air. In this respect, it is indicated that each blade 48 is equipped with a platform 59 from which its aerodynamic part 60 projects radially to the outside. Each platform 59, circular in shape, is placed within an orifice made through the cowling 46, so as to produce substantially flush aerodynamic joins.

As is more evident from FIG. 3, a blade cavity 64 associated with the blade 48 is provided, the aim of this cavity being to insulate the blade foot from the rest of the turboengine 1, in particular from the primary vein moving radially towards the interior. The cavity 64 has been identified schematically in FIG. 3 by the dotted line referenced 64. It is effectively closed radially to the outside by the platform 59 and the external cowling 46 forming aerodynamic fairing, but also closed towards upstream by one or more caches 66, closed to downstream by one or more caches 68, and closed radially to the outside by one or more caches 70, here a single cache 70 fixed to the above flange or clips 44.

It is noted that a blade cavity foot can be provided for each blade, as has been shown in FIG. 5 with an internal cache 70 provided for each blade, which makes the cavities independent of each other. Alternatively, a single blade cavity foot can be shared by all the blades 48 of the propeller 32, the single retained internal cache 70 then taking the form of a crown.

As a possibility for ventilation, each cavity 64 can for example be supplied with external air via a bailer 72 or similar (for example a single orifice), placed on the external cowling 46. This bailer can especially be placed downstream, and the air transiting via the cavity 64 can for example then be extracted via an outlet (not illustrated) located further upstream. As it exits via the cavity 64, the fresh external air contacts and cools by ventilation the elements located in this cavity 64, in particular the foot 58 of the blade as has been shown by arrow 53.

Ventilation and cooling of the elements of the propeller 32, and in particular the blade feet 58, are difficult to execute, especially due to the pressure conditions with low Mach number. However, such ventilation and such cooling are particularly important to carry out when the blades 48 are made of composite materials, as they have reduced performance in high temperatures in comparison with metallic materials. In the so-called <<pusher>> (or <<pusher>> in English) configuration illustrated in FIG. 1, in which the open propellers are located to the rear downstream of the combustion chamber, these propellers are arranged just above the primary vein where hot gases can reach 500° C. It is therefore essential to provide specific ventilation to avoid overheating of the blade feet of these open propellers.

Nevertheless, the solution proposed described hereinabove uses only the difference in pressure between the dynamic air intake downstream formed by the bailer 72, and the static air outlet upstream. It is therefore highly dependent on the speed of the plane, which proves harmful during some phases such as deceleration and takeoff, when the airflow contacting the foot of the blade can prove inadequate for satisfactory cooling.

Also, this solution known from the prior art has the disadvantage of carrying out cooling and ventilation of the blade feet 58 only via the exterior of the pivots 52. In other words, the blade feet 58 are not cooled in direct contact with the ventilation airflow but only by conduction and/or convection mechanisms due to contact with pieces which are cooled by the ventilation flow. Because of this, cooling of the blade feet 58 is not optimal.

Still other documents are known from the prior art illustrating the general technological background of the invention. For example, patent application FR 2 586 754 A1 describes control means for cooling air for variable pitch propeller blade. Patent BE 438 569 A describes various refinements relative to turboengine propellers, and in particular the application of masses subjected adjustably to a blade. Patent application FR 2 967 397 A1 describes a device for reversing a propeller comprising an actuator acting on a crank pin. Patent applications FR 2 963 054 A1 and FR 2 645 590 A1, as well as utility model DE 87 13 745 U1, describe turboengines fitted with contrarotating propellers featuring orifices for ventilation of the blade feet. Finally, patent application US 2011/083417 A1 describes another cooling system integrated at the level of a blade foot for a turboengine of <<open rotor>> type.

EXPLANATION OF THE INVENTION

The aim of the invention is to rectify at least partially the needs mentioned hereinabove and the disadvantages relative to embodiments of the prior art.

The aim of the invention especially is to propose a solution for efficacious ventilation and cooling of blade feet, in particular made of composite materials.

The aim of the invention, according to a first of its aspects, is a propeller for a turboengine comprising a plurality of blades and a blade support ring provided with housings, each receiving a pivot bearing the foot of one of said blades, characterised in that at least one of the pivots is equipped with at least one counterweight system provided with at least one inner airflow discharge channel, especially for cooling the blade foot borne by said at least one of the pivots.

Because of the invention, it can be possible to ventilate and cool the blade feet by bringing the ventilation airflow directly in contact with the blade feet. The inner channel formed in the counterweight system can capture and guide the airflow to the precise place where ventilation is required, that is, especially at the level of the blade feet. The invention can limit high airflows and pressure losses which occur in solutions of the prior art using ventilation of a cavity in which the air is stirred.

The propeller according to the invention can also comprise one or more of the following characteristics taken in isolation or according to all possible technical combinations.

The propeller can in particular be an open propeller.

The airflow is in particular an external airflow, especially a cold external airflow to enable ventilation.

The inner airflow discharge channel can cool the blade foot borne by the pivot. It can also enable cooling of any other element requiring specific ventilation. Similarly, it can also allow ejection of hot airflow to the exterior of the zone to be ventilated.

The inner channel can have an inner end which terminates on the pivot and one at least of an airflow introduction end and an ejection end. In particular, the inner channel can comprise an airflow introduction end and an inner end terminating on the pivot to cool the pivot. As a variant, the inner channel can comprise an inner end terminating on the pivot, via which hot air enters from the pivot towards the inner channel, and an ejection end for evacuating hot air.

The introduction end and/or the ejection end can comprise introduction and/or ejection means in the form of an orifice or a bailer. Preferably, the introduction end and/or the ejection end can comprise a dynamic bailer for introduction and/or ejection of the airflow.

The pivot can comprise at least one inner communicating channel whereof one end terminates at the level of the blade foot and the other end terminates at the level of an inner channel of the counterweight system. The inner communicating channel can introduce the airflow from the inner end of the inner channel towards the blade foot, or eject the airflow from the blade foot towards the inner end of the inner channel. As a variant, the pivot can be provided with an inner communicating channel. The groove of the pivot for affixing the blade foot can for example be fitted with at least one orifice opposite an inner end of an inner channel of a counterweight system.

The pivot can also comprise at least one channel, for example lateral or axial, especially formed under the blade foot, to enable ventilation of the blade foot.

The counterweight system can comprise a counterweight arm and a counterweight. The inner channel can be located in the counterweight arm and/or the counterweight. Preferably, the counterweight arm can comprise the inner channel.

The pivot can be equipped with at least one first counterweight system, provided with at least one first inner channel fitted with an airflow introduction end and an inner end, and a second counterweight system, provided with at least one second inner channel fitted with an ejection end of the airflow and an inner end. The pivot can comprise a first inner communicating channel, whereof one end terminates at the level of the blade foot and the other end terminates at the level of the inner end of the first inner channel, and a second inner communicating channel, whereof one end terminates at the level of the blade foot and the other end terminates at the level of the inner end of the second inner channel.

The blades, in particular the blade feet, and/or said at least one counterweight system and/or said at least one pivot, can be made of composite material.

The counterweight arm can be made in at least two parts, especially metallic. The inner channel can be formed partially in particular, especially by machining, in each of these two parts.

As a variant, the counterweight arm can be made in one part. The counterweight arm, especially made of composite material, for example woven or laminated, can integrate the inner channel, in particular from manufacture onwards.

Also, another aim of the invention, alone or in combination with the above, according to a second of its aspects, is a propeller for a turboengine comprising a plurality of blades and a blade support ring provided with housings, each receiving a pivot bearing the foot of one of said blades, characterised in that at least one of the pivots comprises airflow introduction and/or ejection means intended to ventilate the blade foot.

The airflow introduction and/or ejection means can constitute airflow channeling means.

The airflow introduction and/or ejection means can cool the blade foot borne by the pivot. They can also enable cooling of any other element requiring specific ventilation. Similarly, they can enable ejection of hot airflow to the exterior of the zone to be ventilated. In particular, they can evacuate heat coming from ventilating of the blade feet and/or coming from below the nacelle, with cooling fins for example able to be added to the hot airflow ejection means.

Because of this aspect of the invention, the airflow introduction and/or ejection means can capture and guide the airflow to the precise point where ventilation is required, that is, especially at the level of the blade feet. The invention can also capture the airflow outside the boundary layer, or above the nacelle, without impacting on the mechanical behaviour and aerodynamism of the blades and nacelle. Also, the solution of the invention can help create a thermal screen between the front and rear faces of the blade foot and the hot sources of the nacelle.

The propeller according to this aspect of the invention can also comprise one or more of the following characteristics taken in isolation or according to all possible technical combinations, and especially with one or more of the characteristics mentioned previously.

The airflow introduction and/or ejection means can, at least in part, be integrated into the profile of the corresponding blade of said at least one of the pivots, especially at the level of the leading edge and/or of the trailing edge.

The airflow introduction and/or ejection means can comprise an orifice or preferably a dynamic bailer for the introduction and/or ejection of the airflow.

The pivot can be provided with at least one upright of aerodynamic form capable of engaging in a corresponding housing of the blade, said at least one upright of aerodynamic form comprising airflow introduction and/or ejection means. In particular, the housing of the blade can correspond to an opening made in the blade and the upright of aerodynamic form of the pivot can present an aerodynamic form which substantially contacts the contour of the opening of the blade, having especially a form substantially similar to that of the part of the blade withdrawn in making the opening. Therefore, the fact of providing one or more uprights of aerodynamic form for the pivot can avoid any harmful impact on the aerodynamics of the blade.

Said at least one upright of aerodynamic form can be formed in the pivot and/or connected to the pivot.

At least one upright of aerodynamic form and the corresponding housing of the blade can be formed at the level of the leading edge of the blade, that is, at the front of the blade. Thus, the upright of aerodynamic form can follow the orientation of the blade and always be facing into the wind to capture the maximum fresh air for ventilation of the blade feet.

Airflow introduction and/or ejection means can be formed in the thickness of said at least one pivot. These means can be formed on the lateral surface of said at least one pivot, especially at the level of the leading edge of the blade.

Said at least one pivot can be provided with a first upright of aerodynamic form at the level of the leading edge of the blade, capable of engaging in a first corresponding housing of the blade, and a second upright of aerodynamic form at the level of the edge opposite the blade, capable of engaging in a second corresponding housing of the blade, the first and second housings comprising respectively airflow introduction means and ejection means.

The introduction and/or ejection means of the pivot can let through cables for operation of the turboengine, especially electric supply cables for defrosting and/or blade instrumentation cables. In particular, they can convey such cables on either side of the blade feet.

The pivot and/or the airflow introduction and/or ejection means, especially in the form of one or more dynamic bailers, can be made in different ways, for example by means of composites, metallic materials, by rapid prototyping or even by moulding.

The pivot can comprise a lower part, especially substantially cylindrical and hollow so as to present a general U-shaped cross-section open radially towards the interior, and an upper part located above the blade support ring, this upper part especially having a groove for holding the blade foot.

Also, the pivot can comprise one or more platforms. The platform, especially of circular form, can be placed within an orifice provided through the external cowling of the propeller to produce substantially flush aerodynamic joins. The blade can comprise an aerodynamic part projecting from the platform radially to the outside.

It should also be noted that, throughout the description, the characteristics mentioned relative to the pivot can apply to one at least of the lower part, the upper part and the platform of the pivot. In particular, the lower part and/or the upper part and/or the platform of the pivot can comprise said airflow introduction and/or ejection means and/or said upright of aerodynamic form.

In addition, yet another aim of the invention, taken alone or in combination with the above, according to a third of its aspects is a pivot for a blade foot of a turboengine propeller blade,
characterised in that it comprises cooling means of the blade foot by interaction with ventilation airflow.

Because of this aspect of the invention, the presence of cooling means in the pivot can augment the exchange surface between the pivot and the ventilation airflow. The invention can boost the thermal transfer capacities of the pivot without as such modifying them as a consequence, especially without change to its external geometry or its mechanical characteristics.

The pivot according to this aspect of the invention can also comprise one or more of the following characteristics taken in isolation or according to all possible technical combinations, and especially with one or more of the characteristics mentioned previously.

The cooling means can comprise cooling fins.

The pivot can comprise at least 4, or even at least 6, or even at least 8, or even more, cooling fins.

The cooling fins can be located inside the pivot. In particular, the cooling fins can be distributed symmetrically inside the pivot.

The cooling fins can extend in planes containing the axis of rotation of the pivot.

The pivot can comprise a substantially cylindrical and hollow lower part having a general U-shaped cross-section, and an upper part having a groove for holding the blade foot. The cooling means can be located inside the lower part.

The cooling means of the pivot can be made in different ways, for example by conventional machining or by electroerosion machining (also called EDM for <<Electro Discharge Machining>> in English).

The choice, number and dimensions of the cooling means, especially the cooling fins, can be determined as a function of the preferred thermal surface exchange. However, they can be limited by the footprint available inside the pivot.

The pivot can be equipped with at least one counterweight system provided with at least one inner airflow discharge channel intended to come into contact with the cooling means. The inner airflow discharge channel can cool the blade foot borne by the pivot. It can also enable cooling of any other element requiring specific ventilation. Similarly, it can also enable ejection of hot airflow to the exterior of the zone to be ventilated.

The inner channel formed in the counterweight system can capture and guide the airflow to the precise point where ventilation is required, that is, especially at the level of the blade feet.

The cooling means can be made of composite materials.

Also, another aim of the invention, taken alone or in combination with the above, according to a fourth of its aspects is a pivot for a blade foot of a turboengine propeller blade,
characterised in that it comprises coolant intended to improve the thermal transfer capacities of the pivot.

The coolant can interact in particular with a ventilation airflow for cooling the blade foot. The airflow is in particular external airflow, especially cool external airflow to enable ventilation.

Because of this aspect of the invention, the presence of coolant in the pivot can improve the thermal conductivity of the pivot and therefore boost thermal exchanges. The improvement of thermal transfer of the pivot can for example better evacuate the calories brought by the hot vein of discharge gases located under the pivot or by any other heat source.

The pivot according to this aspect of the invention can also comprise one or more of the following characteristics taken in isolation or as per all possible technical combinations, and especially with one or more of the characteristics mentioned previously.

Coolant can be of different types. It can comprise for example oil or water injected into the pivot. Preferably, coolant can comprise sodium.

Coolant can be injected into a cavity created in the pivot. Preferably, the coolant is contained in a container, the latter being especially hermetically sealed.

The pivot can comprise a lower part, substantially cylindrical and hollow having a general U-shaped cross-section, and an upper part having a groove for holding the blade foot. Coolant can be located inside the lower part of the pivot.

Another aim of the invention, according to another of its aspects, taken alone or in combination with the above, is a propeller for a turboengine comprising a plurality of blades and a blade support ring provided with housings, each receiving a pivot bearing the foot of one of said blades, characterised in that at least one component, especially a pivot and/or a blade, of the propeller comprises coolant intended to improve the thermal transfer capacities of said at least one component of the propeller.

The coolant can be contained in the pivot or any other piece sensitive mechanically and thermally, for example a housing or a blade.

The coolant preferably comprises sodium.

In addition, yet another aim of the invention, taken alone or in combination with the above, according to a fifth of its aspects, is a propeller for a turboengine comprising a plurality of blades and a blade support ring provided with housings, each receiving a pivot bearing the foot of one of said blades, characterised in that at least one of the pivots comprises a Peltier cell for cooling the corresponding blade foot.

A Peltier cell (CEP) or Peltier module is based on a thermoelectric effect which manifests via a physical heat displacement phenomenon in the presence of electric current. The Peltier cell comprises an assembly of semi-conductor elements placed between two electrically insulating but heat-conducting materials. Since continuous electric current passes through such an assembly, a <<cold face>> appears which absorbs heat and a <<hot face>> which releases heat. Therefore, one of the materials reheats while the other cools. The electric current acts as coolant.

Because of this aspect of the invention, it can be possible to ventilate and cool the blade feet by the Peltier cell, located in the immediate proximity of the blade feet. It can be possible to cool a hot zone impacting the blade feet, especially that located inside a turning nacelle under the blade feet, especially by the sole presence of the Peltier cell and an electric cable. The invention can in particular enable effective cooling of the blade feet without requiring the use of a ventilator or gaseous or liquid coolant which could be dangerous. In addition, as no forced convection is required the solution of the invention can engender low levels of noise and vibrations only.

The propeller according to this aspect of the invention can also comprise one or more of the following characteristics taken in isolation or as per all possible technical combinations, and especially with one or more of the characteristics mentioned previously.

The Peltier cell can be made in different ways. Preferably, the Peltier cell comprises fins. The fins can enable capture of ventilation airflow (from the cold source) and diffusion of hot airflow (towards the warm source).

The propeller can comprise electrical means, an electric cable especially, for supplying the Peltier cell with electric current.

The cold source of the Peltier cell can comprise ventilation airflow.

In addition, the warm source of the Peltier cell can comprise the zone located under the blade foot at the level of the hot gas stream, especially an inner zone of a turning nacelle.

The pivot can comprise ventilation airflow introduction and/or ejection means. Such means can bring the airflow into contact with the Peltier cell, then discharge the reheated airflow. Preferably, these means can comprise aerodynamic bailers.

The pivot can comprise a circulation channel of the ventilation airflow. The circulation channel can especially be formed at least partially around the blade foot for its cooling.

The pivot can comprise a lower part, especially substantially cylindrical and hollow so as to present a general U-shaped cross-section open radially towards the interior, and an upper part located above the blade support ring, this upper part having especially a groove for holding the blade foot.

Also, the pivot can comprise a platform. The platform, especially circular in shape, can be placed within an orifice provided through the external cowling of the propeller so as to produce substantially flush aerodynamic joins. The blade can comprise an aerodynamic part projecting from the platform radially to the outside.

The lower part and/or the upper part and/or the platform of the pivot can comprise the Peltier cell and/or the ventilation airflow circulation channel.

Yet another aim of the invention, according to another of its aspects, is a propeller for a turboengine comprising a plurality of blades and a blade support ring provided with housings, each receiving a pivot bearing the foot of one of said blades, characterised in that it comprises a pivot such as defined previously.

Yet another aim of the invention, according to another of its aspects, is a turboengine characterised in that it comprises a pivot such as defined previously or a propeller such as defined previously.

The propeller can for example be upstream or downstream of a combustion chamber of the turboengine.

The turboengine can preferably be of the «open rotor» type.

In particular, the turboengine can comprise a pair of open contrarotating propellers, each of the two propellers being a propeller such as defined previously.

Also, throughout the present description, the propeller according to the invention is preferably a variable-pitch propeller.

BRIEF DESCRIPTION OF FIGURES

The invention will be better understood from the following detailed description of non-limiting examples of the latter, as well as from examination of the figures, schematic and partial, of the attached diagram, in which.

In all these figures, identical reference numerals can designate identical or similar elements.

In addition, the different parts illustrated in the figures are not necessarily according to uniform scale, in the interest of making the figures more legible.

DETAILED EXPLANATION OF PARTICULAR EMBODIMENTS

In reference to FIGS. 6 and 7, two embodiments of a first aspect of the invention relating to an aircraft turboengine with a pair of open contrarotating propellers will be described hereinbelow, though these examples are not limiting.

Figure 1:
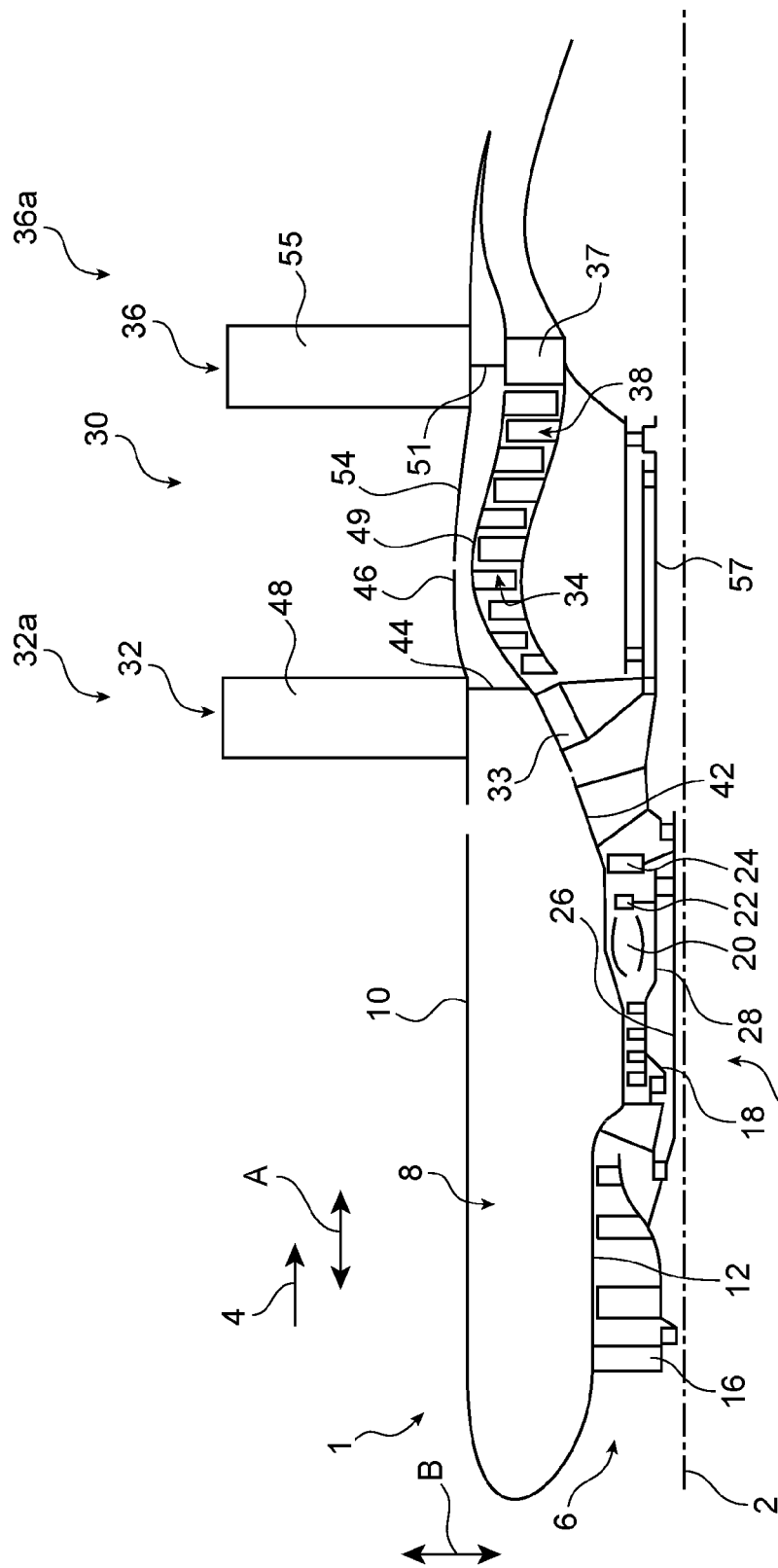
FIG. 1 illustrates a schematic view in longitudinal half section of a turboengine for aircraft comprising a receiver with a pair of contrarotating propellers, according to a classic design of the prior art.
Figure 2:
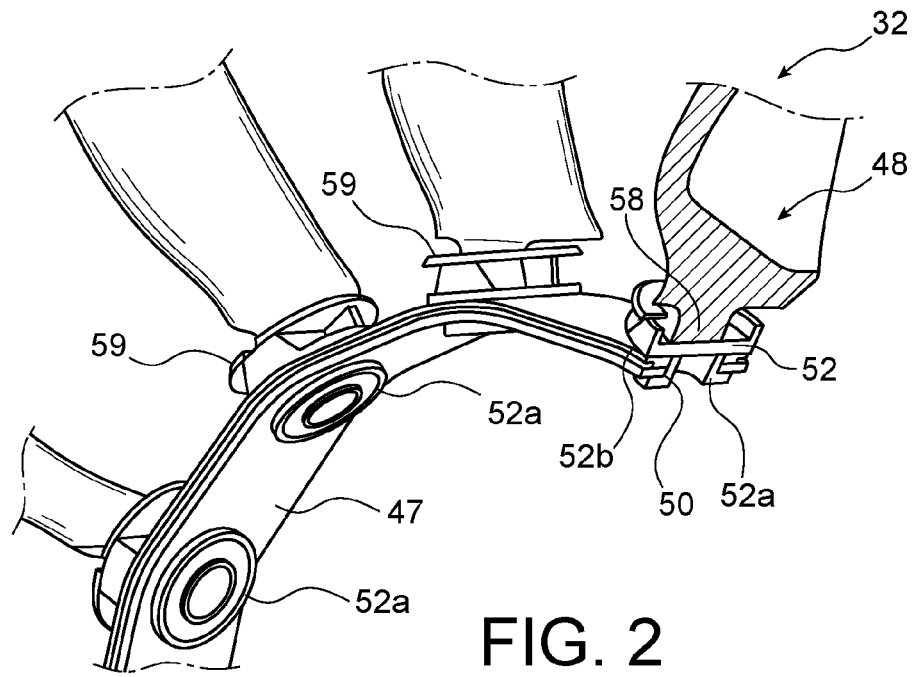
FIG. 2 illustrates a partial view in perspective of one of the contrarotating propellers of the turboengine shown in FIG. 1.
Figure 3:
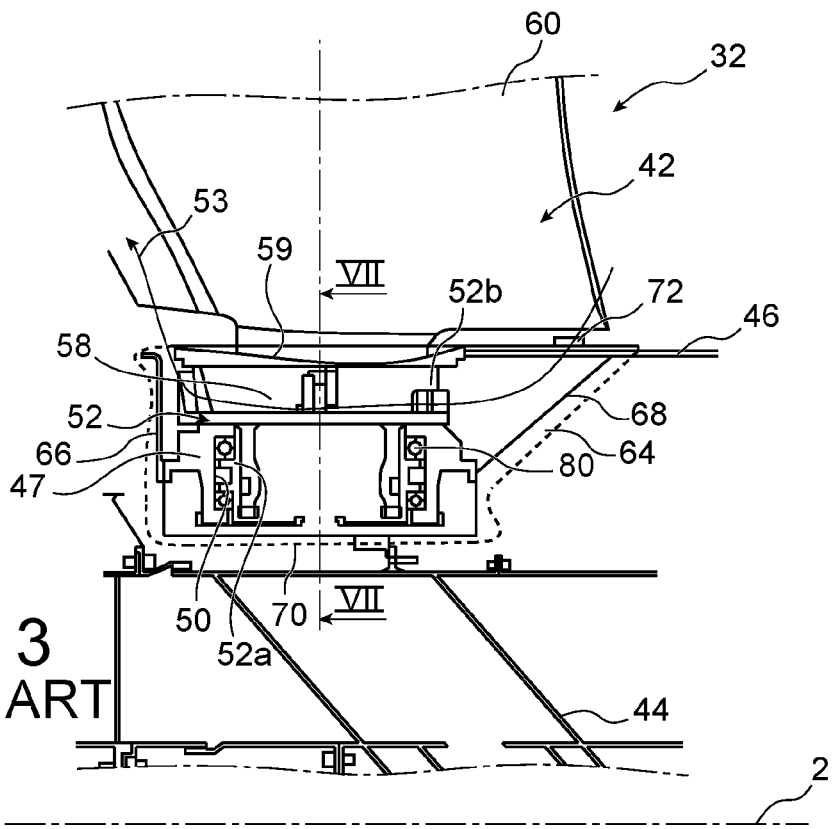
FIG. 3 illustrates a partial view in section showing in more detail the blade support ring of the propeller, and the surrounding elements.
Figure 4:
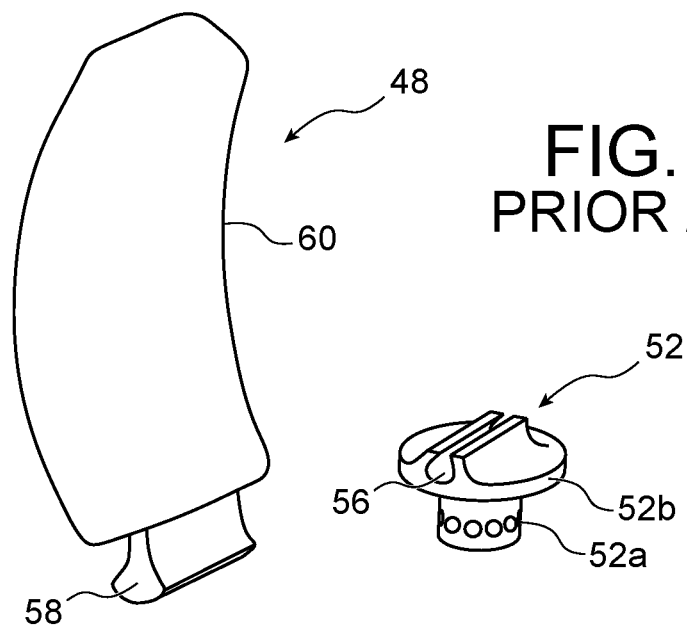
FIG. 4 illustrates an exploded view in perspective of a blade and its associated pivot.
Figure 5:
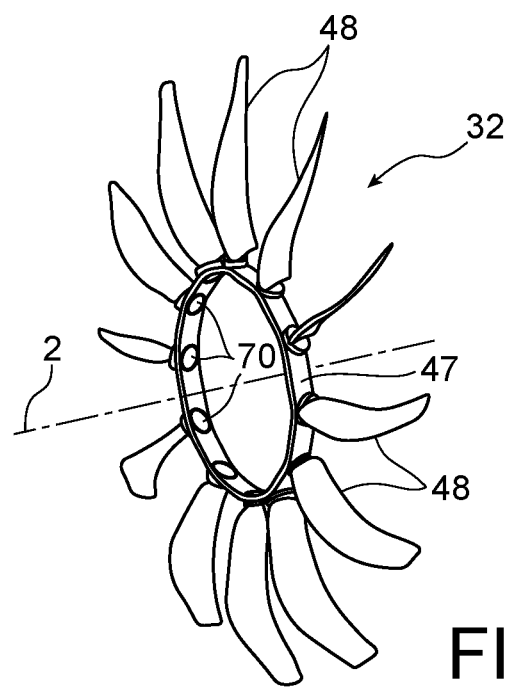
FIG. 5 illustrates a view in perspective of a propeller of the prior art, equipped with several blade feet cavities.
Figure 6:
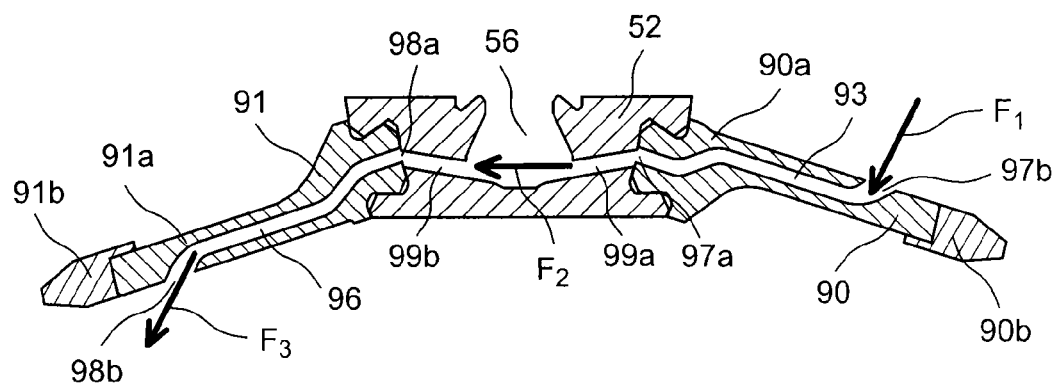
FIG. 6 illustrates, in section and partially, an embodiment of a propeller according to a first aspect of the invention.
Figure 7:
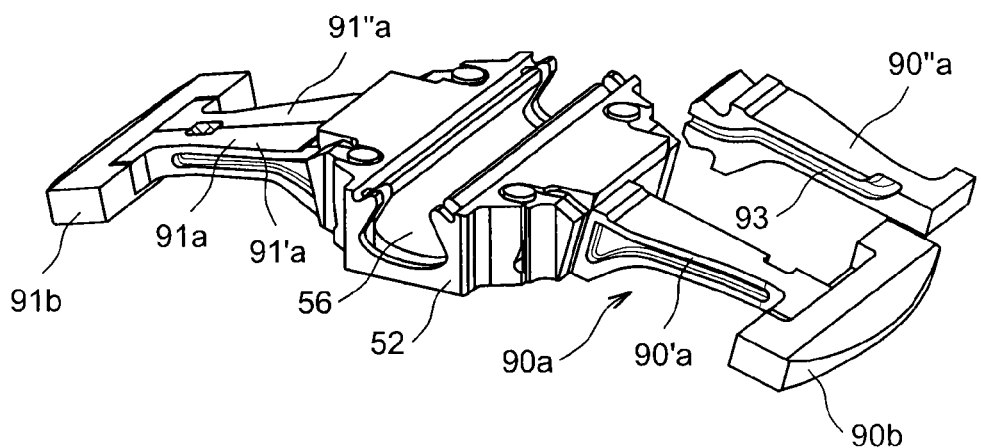
FIG. 7 illustrates, in perspective, a variant embodiment of the example of FIG. 6.

FIGS. 6 and 7 are schematic and partial, and reference should be made to FIGS. 1 to 5 previously described for viewing those elements not illustrated in FIGS. 6 and 7. In FIG. 6 in particular, the cylindrical part of the pivot especially has been omitted.

In reference to FIG. 6, this illustrates a pivot 52 fitted with a groove 56 for affixing a blade foot 58 (not illustrated), according to what has been described previously.

The pivot 52 is equipped with a first counterweight system 90 and a second counterweight system 91. Each of the counterweight systems 90 and 91 is provided with an inner airflow discharge channel 93 and 96.

The first counterweight system 90 comprises a counterweight arm 90a and a counterweight 90b at the end of the arm 90a opposite the pivot 52. Similarly, the second counterweight system 91 comprises a counterweight arm 91a and a counterweight 91b at the end of the arm 91a opposite the pivot 52. The counterweight arm 90a and 91a comprise respectively the inner channels 93 and 96.

The inner channel 93 has an inner end 97a which terminates on the pivot 52 and an airflow introduction end 97b.

Also, the inner channel 96 has an inner end 98a which terminates on the pivot 52 and an airflow ejection end 98b.

The introduction end 97b and the ejection end 98b each comprise a detachable dynamic bailer for passage of the airflow.

Also, the pivot 52 comprises a first inner communicating channel 99a whereof one end terminates at the level of the blade foot 58 and the other end terminates at the level of the inner channel 93 of the first counterweight system 90. Similarly, the pivot 52 comprises a second inner communicating channel 99b whereof one end terminates at the level of the blade foot 58 and the other end terminates at the level of the inner channel 96 of the second counterweight system 91.

Therefore, the airflow is capable of being captured by the dynamic bailer at the level of the introduction end 97b of the first counterweight arm 90a according to arrow $F_1$, then being discharged inside the inner channel 93 and the inner communicating channel 99a to cool the blade foot 58 according to arrow $F_2$. Next, the resulting hot flow can discharge into the inner communicating channel 99b and into the inner channel 96 to be ejected at the level of the ejection end 98b of the second counterweight arm 91b according to arrow $F_3$, to the outside or towards the nacelle of the engine.

Making the inner channels 93 and 96 in the counterweight arm 90 and 91 and the presence of bailers at the ends 97b and 98b for introduction and ejection of airflow can produce optimal cooling of the blade foot 58 since fresh airflow comes into direct contact with the latter. The counterweight arms 90 and 91 can steer the dynamic bailers and channel airflow to send it directly towards the blade foot 58. The invention can directly and mechanically link the need for ventilation to the blade pitching, and then to the different flight points.

The embodiment of the invention illustrated in FIG. 7 illustrates a variant embodiment of the counterweight arms 90a and 90b.

In this example, each counterweight arm 90a and 90b is respectively made in two parts 90a', 90a" and 91a', 91a".

The two parts 90a', 90a" and 91a', 91a" are preferably symmetrical relative to their parting line and are made of metallic material. They are joined together to be fixed in corresponding housings of the pivot 52 and counterweight 90a and 90b.

The inner channel 93 is half formed, especially by machining, in the first part 90a' of the counterweight arm 90a and half in the second part 90a" of the arm 90a. Thus, joining the first 90a' and second 90a" parts of the arm 90a forms the inner channel 93.

Similarly, the inner channel 96 is half formed, especially by machining, in the first part 91a' of the counterweight arm 91a and half in the second part 91a" of the arm 91a. Joining the first 91a' and second 91a" parts of the arm 91a forms the inner channel 96.

As a variant, the inner channels 93 and 96 can be integrated directly in the counterweight arm 90a and 91a from manufacture onwards, especially when the latter are made of composite material, for example woven or laminated.

Embodiments of a second aspect of the invention relating to an aircraft turboengine with a pair of open contrarotating propellers will now be described hereinbelow, in reference to FIGS. 8, 9 and 10, though these examples are limiting.

Figure 8:
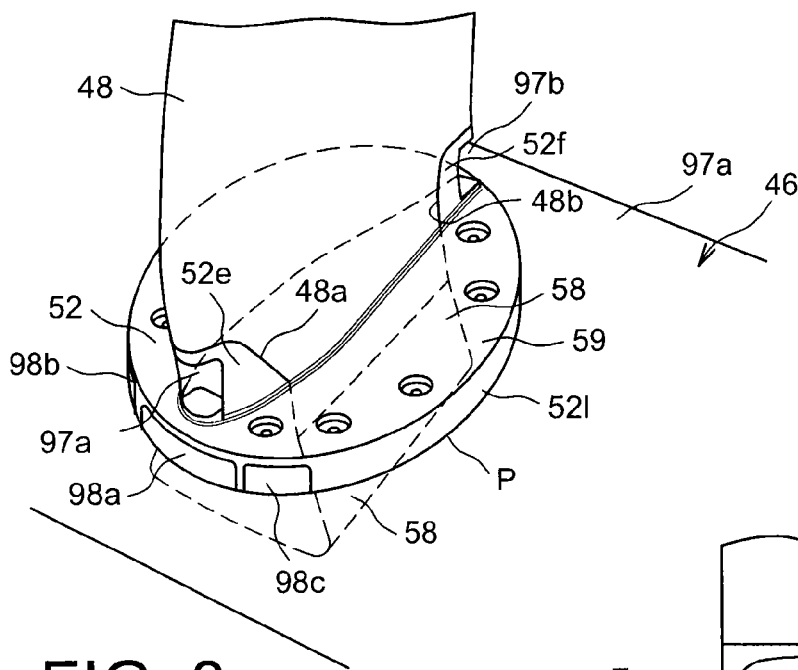
FIG. 8 illustrates, in perspective, another embodiment of a propeller according to a second aspect of the invention.
Figure 9:
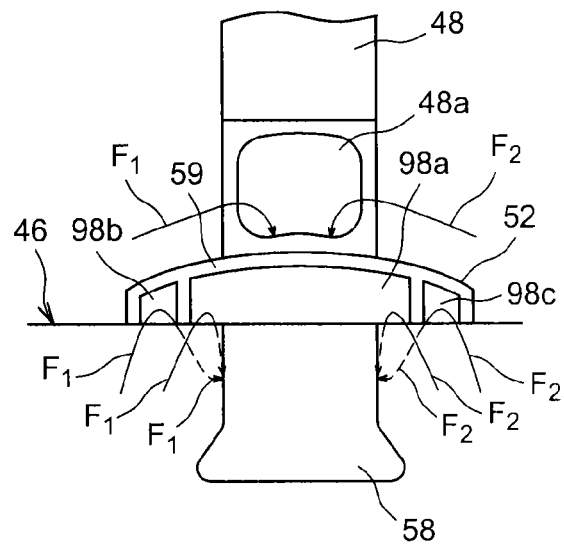
FIG. 9 illustrates a frontal view of the embodiment of FIG. 8.
Figure 10:
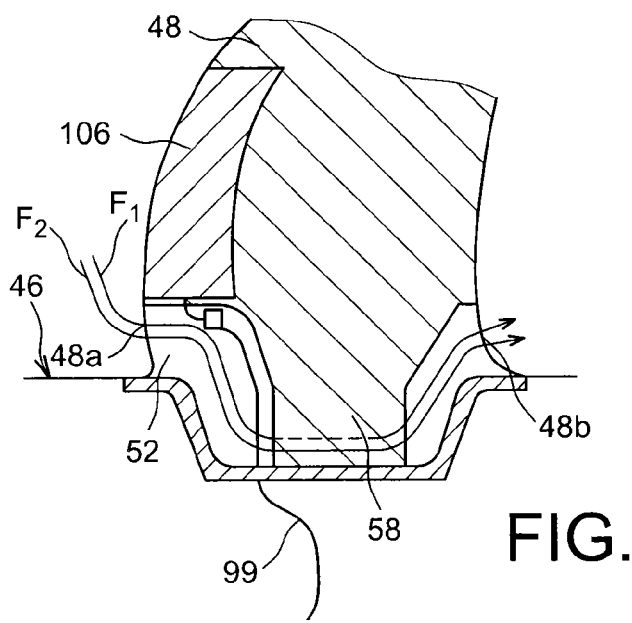
FIG. 10 illustrates, in section, another embodiment according to the second aspect of the invention.

FIGS. 8, 9 and 10 are schematic and partial, and reference should be made to FIGS. 1 to 5 previously described for viewing those elements not illustrated in FIGS. 8, 9 and 10.

In reference to FIGS. 8 and 9, these illustrate a first embodiment of a propeller according to the invention.

The pivot 52 comprises a part whereof the contour P is based on the external propeller cowling 46, such that this part is located above the nacelle, in contact with the air. It is said to be located above the nacelle line.

The blade foot 58, illustrated in dotted lines in FIG. 8, is located under the external propeller cowling 46, otherwise known as under the nacelle line, as can be seen especially in FIG. 9.

In keeping with the invention, the pivot 52, and especially the platform 59 of the pivot 52, comprises airflow introduction and/or ejection means intended to ventilate the blade foot 58.

In particular, the pivot 52, and especially the platform 59 of the pivot 52, comprises a first upright of aerodynamic form 52e located on the front of the pivot 52, at the level of the leading edge of the blade 48, and a second upright of aerodynamic form 52f, located to the rear of the blade 48.

The first 52e and second 52f uprights of aerodynamic form are capable of engaging in first 48a and second 48b housings of the blade 48.

The first upright of aerodynamic form 52e can comprise airflow introduction means, especially a dynamic bailer 97a, and the second upright of aerodynamic form 52f can comprise airflow ejection means, especially a dynamic bailer 97b. The bailers 97a and 97b can respectively capture and evacuate the ventilation airflow.

Also, the pivot 52, especially the platform 59, comprises in the thickness of its lateral surface 52l other introduction means of the airflow, specifically bailers 98a, 98b and 98c, arranged on the front of the pivot 52 at the level of the leading edge of the blade 48.

These bailers 98a to 98c can for example be seen when the pivot 52 turns with the blade 48 and the step between the nacelle and the pivot 52 appears.

As can be seen in FIGS. 8 and 9, the uprights of aerodynamic form 52e and 52f comprising the introduction and/or ejection means 97a and 97b in the form of dynamic bailers, as well as the introduction means 98a to 98c also in the form of dynamic bailers, are located beyond the nacelle line such that they enable introduction and/or ejection of ventilation airflow to the exterior of the nacelle.

The fact of providing the bailer 97a in a profiled part of the pivot 52, at the level of the leading edge of the blade 48, can mean having a bailer always oriented in the same way as the blade 48, in other words with a slight angle of incidence relative to the discharge of airflow allowing good capacity for capturing air.

In a frontal view, FIG. 9 illustrates more precisely the discharge of airflow in the bailers 97a and 98a to 98c arranged in the pivot 52.

More particularly, the airflow comes from the front of the blade 48 and is then directed towards the blade foot 58, under the nacelle line, in the form for example of two discharge channels $F_1$ and $F_2$ passant on each side of the blade foot 58.

More specifically, as illustrated, the first discharge channel $F_1$ can essentially comprise for example airflow passing via the bailers 97a, 98b and 98a, and the discharge channel $F_2$ can essentially comprise airflow passing via the bailers 97a, 98c and 98a.

After passing on either side of the blade foot 58, the discharge channels $F_1$ and $F_2$, can be joined and directed towards the edge of the blade 48 and/or the surface of the pivot 52 to be evacuated, especially by means of the bailer 97b located to the rear of the blade 48.

FIG. 10 illustrates another embodiment of a propeller according to the invention.

In this example, bailers 97a and 97b can be arranged in the pivot 52 similarly to what has been described in reference to FIGS. 8 and 9, to allow passage of discharge channels $F_1$ and $F_2$.

FIG. 10 illustrates more specifically that the introduction and/or ejection means, especially in the form of bailers 97a and 97b, can also allow passage of cables involved in operating the turboengine 1, for example electric supply cables for defrosting the blade 48 and/or instrumentation cables of the blade 48.

In this example in particular, a defrosting device 106 can be provided on the front of the blade 48 to which electric supply cables 99 are connected, capable of being placed in the airflow introduction and/or ejection means provided in the pivot 52 under the blade foot 58.

By providing airflow introduction and/or ejection means, especially in the form of dynamic bailers, on the pivot 52 provided especially with uprights 97a, 97b of aerodynamic form, the invention can ventilate, and in particular cool, the blade feet 58 by channeling the airflow directly to their contact for optimal ventilation.

In reference to FIGS. 11 and 12, two embodiments of a third aspect of the invention relating to an aircraft turboengine with a pair of open contrarotating propellers will be described hereinbelow, though these examples are limiting.

Figure 11:
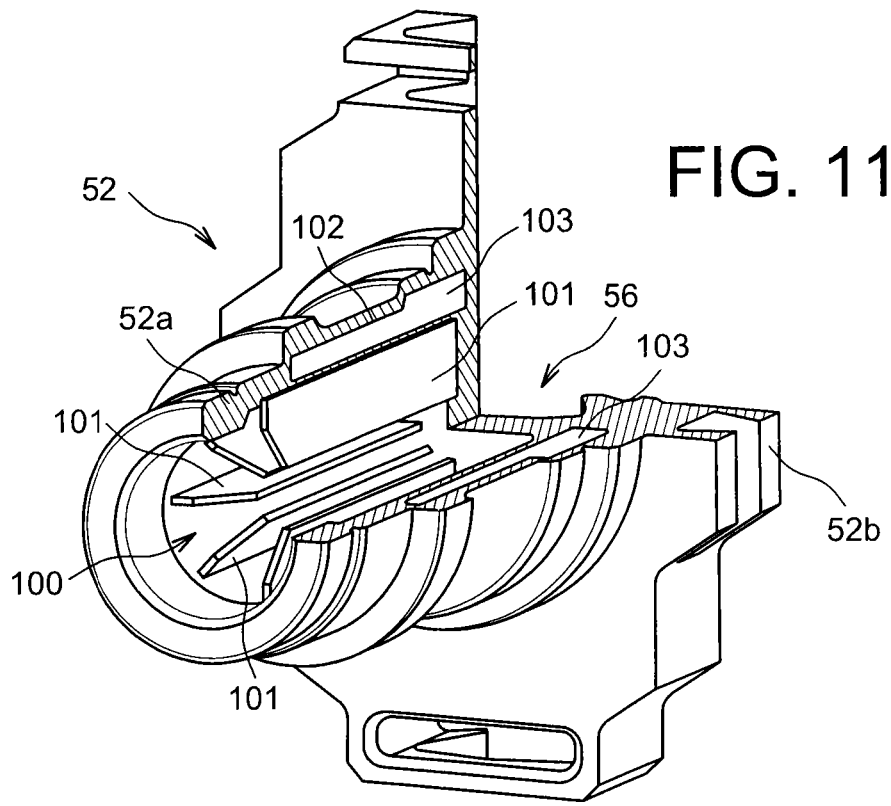
FIG. 11 illustrates, in perspective, an example of a pivot for a propeller according to a third aspect of the invention.
Figure 12:
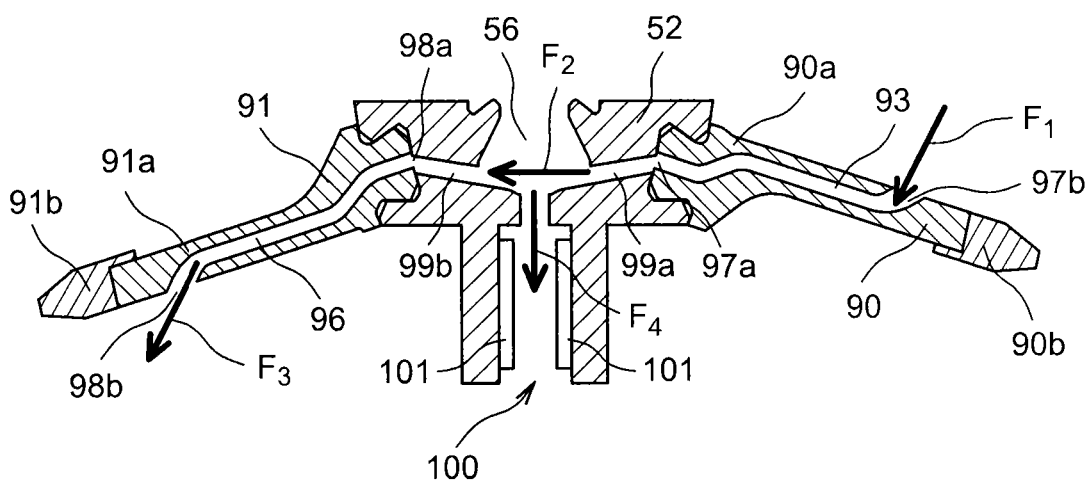
FIG. 12 illustrates, in section and partially, another example of a pivot for a propeller according to the third aspect of the invention, comprising counterweight systems.

FIGS. 11 and 12 are schematic and partial, and reference should be made to aux FIGS. 1 to 5 previously described for viewing the elements not illustrated in FIGS. 11 and 12.

In reference to FIG. 11, this illustrates a first example of a pivot 52 according to the invention.

The pivot 52 comprises a substantially cylindrical and hollow lower part 52a having a general U-shaped cross-section, as well as an upper part 52b having a groove 56 for holding the blade foot 58.

In keeping with the invention, the pivot 52 comprises cooling means 100.

More specifically, the cooling means 100 comprise cooling fins 101 distributed symmetrically inside the pivot 52 (in the bore of the pivot 52), in particular inside the lower part 52a. The pivot 52 comprises for example at least six cooling fins 101.

Advantageously, the cooling fins 101 can interact with ventilation airflow for cooling the blade foot 58. The airflow, in contact with the cooling fins 101, allows the latter to augment the air/metal thermal exchange surface by improving thermal exchanges between the airflow and the pivot 52.

FIG. 12 illustrates another example of a pivot 52 according to the invention associated with counterweight systems 90 and 91 for conveying external airflow in contact with the blade foot 58 and cooling fins 101.

More particularly, the pivot 52 is equipped with a first counterweight system 90 and a second counterweight system 91. Each of the counterweight systems 90 and 91 is provided with an inner airflow discharge channel 93 and 96.

The first counterweight system 90 comprises a counterweight arm 90a and a counterweight 90b at the end of the arm 90a opposite the pivot 52. Similarly, the second counterweight system 91 comprises a counterweight arm 91a and a counterweight 91b at the end of the arm 91a opposite the pivot 52. The counterweight arm 90a and 91a comprise respectively the inner channels 93 and 96.

The inner channel 93 has an inner end 97a which terminates on the pivot 52 and an airflow introduction end 97b.

Also, the inner channel 96 has an inner end 98a which terminates on the pivot 52 and an airflow ejection end 98b.

The introduction end 97b and the ejection end 98b each comprise a dynamic bailer detachable for the passage of airflow.

Also, the pivot 52 comprises a first inner communicating channel 99a whereof one end terminates at the level of the blade foot 58 and the other end terminates at the level of the inner channel 93 of the first counterweight system 90. Similarly, the pivot 52 comprises a second inner communicating channel 99b whereof one end terminates at the level of the blade foot 58 and the other end terminates at the level of the inner channel 96 of the second counterweight system 91.

Therefore, the airflow is capable of being captured by the dynamic bailer at the level of the introduction end 97b of the first counterweight arm 90a according to arrow $F_1$, then discharging inside the inner channel 93 and the inner communicating channel 99a to cool the blade foot 58 according to arrow $F_2$. At this level, the airflow also communicates with the cooling fins 101 of the pivot 52 according to arrow $F_4$, which increases ventilation around the pivot 52 and the passage of fresh air on virtually the entire blade foot 58 to cool it. Next, the resulting hot flow can discharge into the inner communicating channel 99b and in the inner channel 96 to be ejected at the level of the ejection end 98b of the second counterweight arm 91b according to arrow $F_3$, to the outside or towards the nacelle of the engine.

In reference to FIG. 13, an embodiment of a fourth aspect of the invention relating to an aircraft turboengine with a pair of open contrarotating propellers will now be described hereinbelow, though this example is not limiting.

Figure 13:
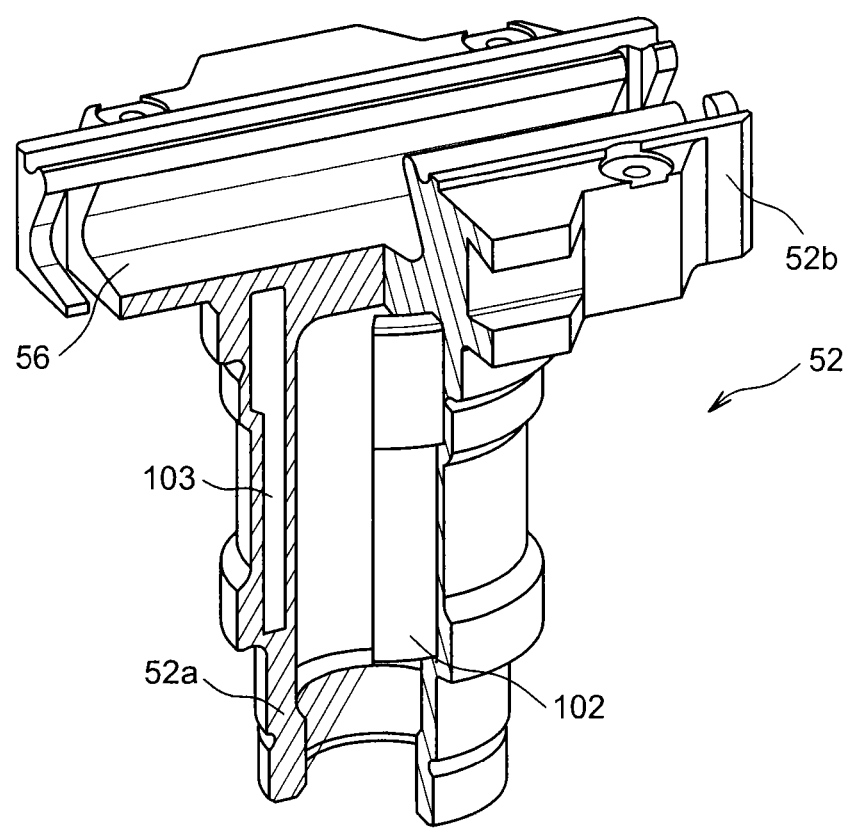
FIG. 13 illustrates, in perspective, an example of a pivot for a propeller according to a fourth aspect of the invention.

FIG. 13 is schematic and partial, and reference should be made to FIGS. 1 to 5 previously described for viewing those elements not illustrated in FIG. 13.

In reference to FIG. 13, this illustrates an example of a pivot 52 according to the invention.

The pivot 52 comprises a substantially cylindrical and hollow lower part 52a having a general U-shaped cross-section, as well as an upper part 52b having a groove 56 for holding the blade foot 58.

According to the invention, the pivot 52 comprises coolant 103, the latter especially comprising sodium.

The coolant 103 is for example contained in a container 102, housed inside the pivot 52, in the lower part 52a.

The presence of sodium 103 in the container 102 improves the thermal conductivity of the pivot 52 and augments possible thermal exchanges with ventilation airflow for cooling the blade foot 58.

In particular, it can be possible to guide heat from the base of the pivot 52, that is, from the base of the lower part 52a near the hot vein, towards the top of the pivot 52, that is, at the level of the upper part 52b near the blade foot 58 in contact with the fresh ventilation air.

The container 102 can be made by machining.

The container 102 must preferably be made so as not to limit the mechanical performance of the pivot 52. In particular, the container 102 must be hermetically sealed once the sodium 103 or any other coolant is injected inside the latter.

It is especially important to ensure that no air bubble is trapped inside the container 102 once the latter is filled with sodium, to prevent any risk of divergent chemical reaction between the sodium 103 and the water contained in the air in the form of humidity.

In addition, the presence of air bubbles in the container 102 could cause reheating of the air due to thermal transfers, which would cause a rise in pressure in the container 102 and an unwanted rise in mechanical stresses on the pivot 52.

In reference to FIGS. 14 and 15, an embodiment of a fifth aspect of the invention relating to an aircraft turboengine with a pair of open contrarotating propellers will finally be described hereinbelow, though these examples are not limiting.

Figure 14:
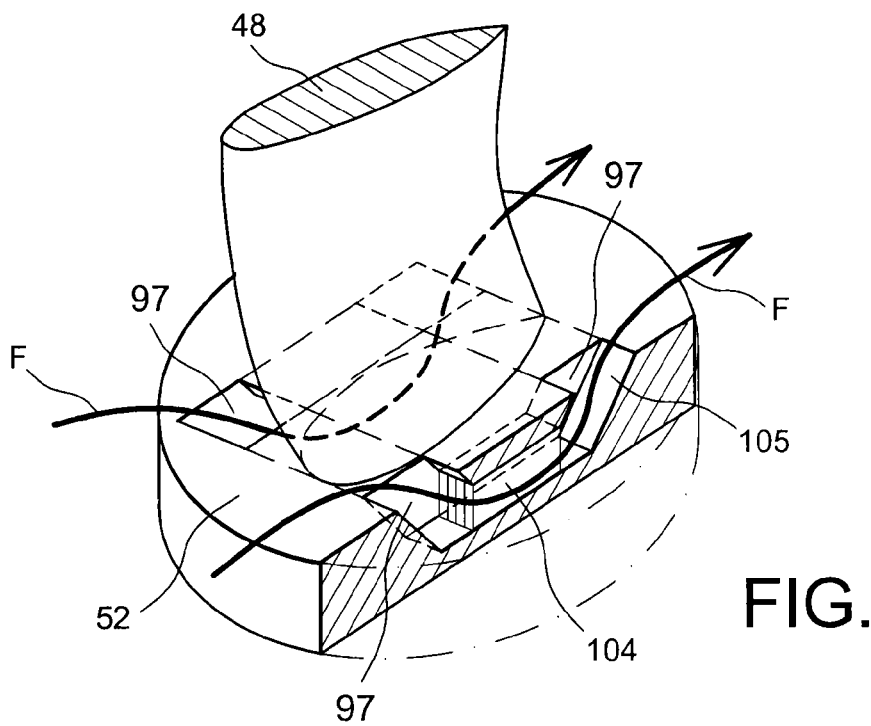
FIG. 14 illustrates partially, in perspective and in partial section, an example of a platform of a pivot fitted with a blade equipping a propeller according to a fifth aspect of the invention.
Figure 15:
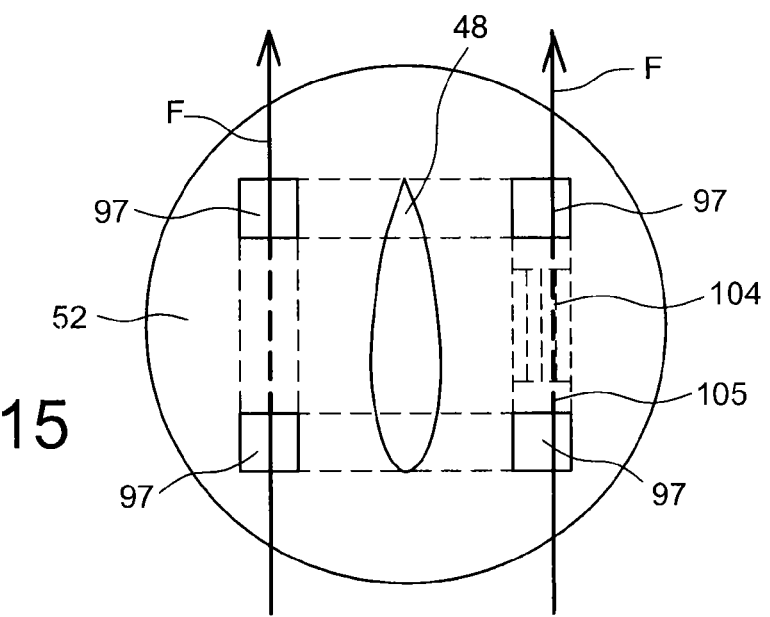
FIG. 15 is a plan view, schematic and partial, of the embodiment of FIG. 14.

FIGS. 14 and 15 are schematic and partial, and reference should be made to FIGS. 1 to 5 previously described for viewing those elements not illustrated in FIGS. 14 and 15.

In reference to FIGS. 14 and 15, these illustrate a pivot 52, especially the platform of the pivot 52, for affixing a blade foot 58, in accordance with what has been described previously.

According to the invention, the pivot 52 comprises a Peltier cell in the form of fins 104 to enable cooling of the blade foot 58.

More particularly, the fins 104 can connect a warm source to be cooled, and especially the interior of a turning nacelle of the turboengine 1 around the blade foot 58, to a cold source via which calories can be evacuated, for example by means of an electrical path.

The cold source for example comprises ventilation airflow F, captured from the exterior because of the dynamic bailers 97, then is guided in a circulation channel 105 formed in the pivot 52, and especially in the platform 59, and intended to bring the ventilation airflow F into contact with the fins 104.

The fins 104 also receive hot air originating from the warm source located under the blade foot 58.

Electrical means, and especially an electric cable (not illustrated), are also provided for supplying continuous current from the fins 104 and the appearance of the Peltier effect.

The Peltier effect can at least partially evacuate heat from the warm source by way of ventilation airflow F and therefore cool the zone located under the blade foot 58.

Some of the dynamic bailers 97 can enable introduction of the ventilation airflow F but also evacuation of the heated airflow. Also, at least one part of the bailers 97 can be located at the level of the leading edge of the blade 48 so as to always be oriented in the same way as the blade 48 for best capturing external air.

In all the examples previously described, the blades 48 and/or the pivots 52 and/or the counterweight systems 90 and 91 and/or the cooling fins 101 can be made of composite material.

Of course, the invention is not limited to the embodiments which have just been described. Various modifications can be made by the person skilled in the art.

In particular, the examples described hereinabove in reference to the first, second, third, fourth and fifth aspects of the invention can be combined together, according to all possible technical combinations.

By way of examples, the propeller 32 of the example of FIG. 6 according to the first aspect of the invention can comprise cooling means 100 formed by cooling fins 101 such as according to the third aspect of the invention, and as illustrated in FIG. 12. Similarly, this same propeller 32 can also comprise coolant 103 contained in a hermetically sealed container 102 such as according to the fourth aspect of the invention, and as illustrated in FIG. 11. Thus, it is possible to favour and further improve the thermal transfer capacities of the pivot 52.

Also, in variants, not shown, embodiments according to the second and fifth aspects of the invention, such as for example respectively according to FIGS. 8 and 14, can also be combined into embodiments according to the first, third and fourth aspects of the invention, such as for example respectively according to FIGS. 6, 11 and 13.

The expression <<comprising a>> must be understood as being synonymous with <<comprising at least one>>, unless otherwise specified.

The invention claimed is:

1. A propeller for a turboengine comprising:
   a blade; and
   a blade support ring provided with a housing, the housing receiving a pivot supporting a foot of the blade,
   wherein the pivot is equipped with a counterweight system provided with an inner ventilation discharge channel for airflow to capture and guide said airflow directly in contact with the foot of the blade supported by the pivot,
   wherein the pivot includes an inner communicating channel in fluid communication with the inner ventilation discharge channel, and
   wherein the counterweight system includes a counterweight arm in which the inner ventilation discharge channel is provided.

2. The propeller as claimed in claim 1, wherein said inner ventilation discharge channel has an inner end which terminates on said pivot and at least one of an airflow introduction end and an ejection end.

3. The propeller as claimed in claim 2, wherein said at least one of the introduction end and the ejection end includes at least one of an airflow introduction means and an ejection means including an orifice.

4. The propeller as claimed in claim 1, wherein a first end of the inner communicating channel terminates at a level of the blade foot and a second end of the inner communicating channel terminates at a level of said inner ventilation discharge channel of said counterweight system.

5. The propeller as claimed in claim 1, wherein said counterweight system further comprises a counterweight.

6. The propeller as claimed in claim 5, wherein the counterweight arm is made of two parts, said inner ventilation discharge channel being formed partially in each of the two parts.

7. The propeller as claimed in claim 1, wherein said pivot is equipped with a first counterweight system, provided with a first inner channel fitted with an airflow introduction end and an inner end, and a second counterweight system, provided with a second inner channel fitted with an airflow ejection end and an inner end, and wherein said pivot comprises a first inner communicating channel, whereof a first end terminates at a level of the blade foot and a second end terminates at a level of the inner end of the first inner channel, and a second inner communicating channel, whereof a first end terminates at the level of the blade foot and a second end terminates at a level of the inner end of the second inner channel.

8. The propeller as claimed in claim 1, wherein said pivot enables pitching of the blade by controlling rotation of said pivot within the housing of the blade support ring.

9. The propeller as claimed in claim 1, wherein said pivot comprises at least one of airflow introduction means and ejection means including an orifice to ventilate the foot of the blade.

10. The propeller as claimed in claim 9, wherein the at least one of the airflow introduction means and ejection means is integrated in a blade profile, at a level of at least one of a leading edge and trailing edge of the blade.

11. The propeller as claimed in claim 9, wherein said pivot is provided with an upright of aerodynamic form capable of engaging in a corresponding upright housing of the blade, said upright of aerodynamic form comprising the at least one of airflow introduction means and ejection means.

12. The propeller as claimed in claim 11, wherein the upright of aerodynamic form and the corresponding upright housing of the blade are formed at a level of a leading edge of the blade.

13. The propeller as claimed in claim 9, wherein the at least one of the airflow introduction means and ejection means is formed in a thickness of said pivot, on a lateral surface of said pivot at a level of a leading edge of the blade.

14. The propeller as claimed in claim 9, wherein said pivot is provided with a first upright of aerodynamic form at a level of a leading edge of the blade, capable of engaging in a first corresponding upright housing of the blade, and a second upright of aerodynamic form at a level of an edge opposite the blade, capable of engaging in a corresponding second upright housing of the blade, the first and second upright housings comprising respectively the airflow introduction means and ejection means.

15. The propeller as claimed in claim 9, wherein the at least one of the airflow introduction means and ejection means of said pivot allows cables through for operation of the turboengine.

16. The propeller as claimed in claim 1, wherein said pivot comprises cooling means of the blade foot by interaction with the ventilation airflow, the cooling means comprising cooling fins located inside the pivot.

17. The propeller as claimed in claim 16, wherein the cooling fins are distributed symmetrically inside the pivot.

18. The propeller as claimed in claim 16, wherein the pivot comprises a substantially cylindrical and hollow lower part having a general U-shaped cross-section, and an upper part having a groove for holding the blade foot, the cooling means being located inside the lower part.

19. The propeller as claimed in claim 16, wherein at least one of the blade, the pivot, the counterweight system, and the cooling means is made of composite material.

20. The propeller as claimed in claim 1, wherein said pivot comprises coolant.

21. The propeller as claimed in claim 20, wherein the coolant comprises sodium.

22. The propeller as claimed in claim 20, wherein the coolant is contained in a hermetically sealed container.

23. The propeller as claimed in claim 20, wherein the pivot comprises a substantially cylindrical and hollow lower part having a general U-shaped cross-section, and an upper part having a groove to hold the blade foot, the coolant being located inside the lower part.

24. The propeller as claimed in claim 1, wherein said pivot comprises a Peltier cell.

25. The propeller as claimed in claim 24, wherein the Peltier cell comprises fins.

26. The propeller as claimed in claim 24, further comprising electrical means, including an electric cable, for supplying the Peltier cell with electric current.

27. The propeller as claimed in claim 24, wherein a cold source of the Peltier cell comprises the ventilation airflow, and wherein a warm source of the Peltier cell comprises a zone located under the blade foot at a level of hot gas stream.

28. The propeller as claimed in claim 27, wherein said pivot comprises at least one of airflow introduction means and ejection means of the ventilation airflow including an orifice.

29. The propeller as claimed in claim 27, wherein said pivot comprises a circulation channel of the ventilation airflow.

30. The propeller as claimed in claim 29, wherein the circulation channel is formed at least partially around the blade foot.

31. A turboengine comprising a propeller as claimed in claim 1.

32. A turboengine comprising a pair of propellers, contrarotating with respect to each other, each propeller of the pair being according to the propeller of claim 1, said pair of propellers being located downstream of a combustion chamber of said turboengine.

* * * * *